(12) United States Patent
Rentz

(10) Patent No.: US 7,290,480 B2
(45) Date of Patent: Nov. 6, 2007

(54) SWING CYLINDER

(75) Inventor: Matthew Rentz, Shelby Township, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 11/345,951

(22) Filed: Feb. 2, 2006

(65) Prior Publication Data
US 2006/0174760 A1    Aug. 10, 2006

Related U.S. Application Data

(60) Provisional application No. 60/651,178, filed on Feb. 8, 2005.

(51) Int. Cl.
*B23Q 3/08*    (2006.01)
*F01B 9/00*    (2006.01)

(52) U.S. Cl. .............................. 92/136; 269/27; 269/35

(58) Field of Classification Search ................. 269/27, 269/32, 35; 92/136
See application file for complete search history.

(56) References Cited

U.S. PATENT DOCUMENTS

| | | | |
|---|---|---|---|
| 3,948,502 A | 4/1976 | Waller et al. | |
| 4,164,344 A * | 8/1979 | Deragne | 269/27 |
| 4,923,184 A | 5/1990 | Schauss | |
| 4,928,577 A * | 5/1990 | Stoll | 92/177 |
| 5,005,468 A | 4/1991 | Ulle | |
| 5,437,440 A | 8/1995 | Keaton | |
| 6,427,992 B1 | 8/2002 | Noda et al. | |
| 6,929,254 B2 | 8/2005 | Steele et al. | |
| 2003/0234478 A1 | 12/2003 | Steele et al. | |

* cited by examiner

*Primary Examiner*—F. Daniel Lopez
(74) *Attorney, Agent, or Firm*—Raggio & Dinnin, P.C.

(57) ABSTRACT

A swing cylinder having a body and an end cap on each end of the body. The cylinder also has a piston arranged within the body. The cylinder has a rod engaged with the piston and has an arm attached to one end thereof. A guide is arranged on the opposite end of the rod. The guide is also attached to one of the end caps.

18 Claims, 6 Drawing Sheets

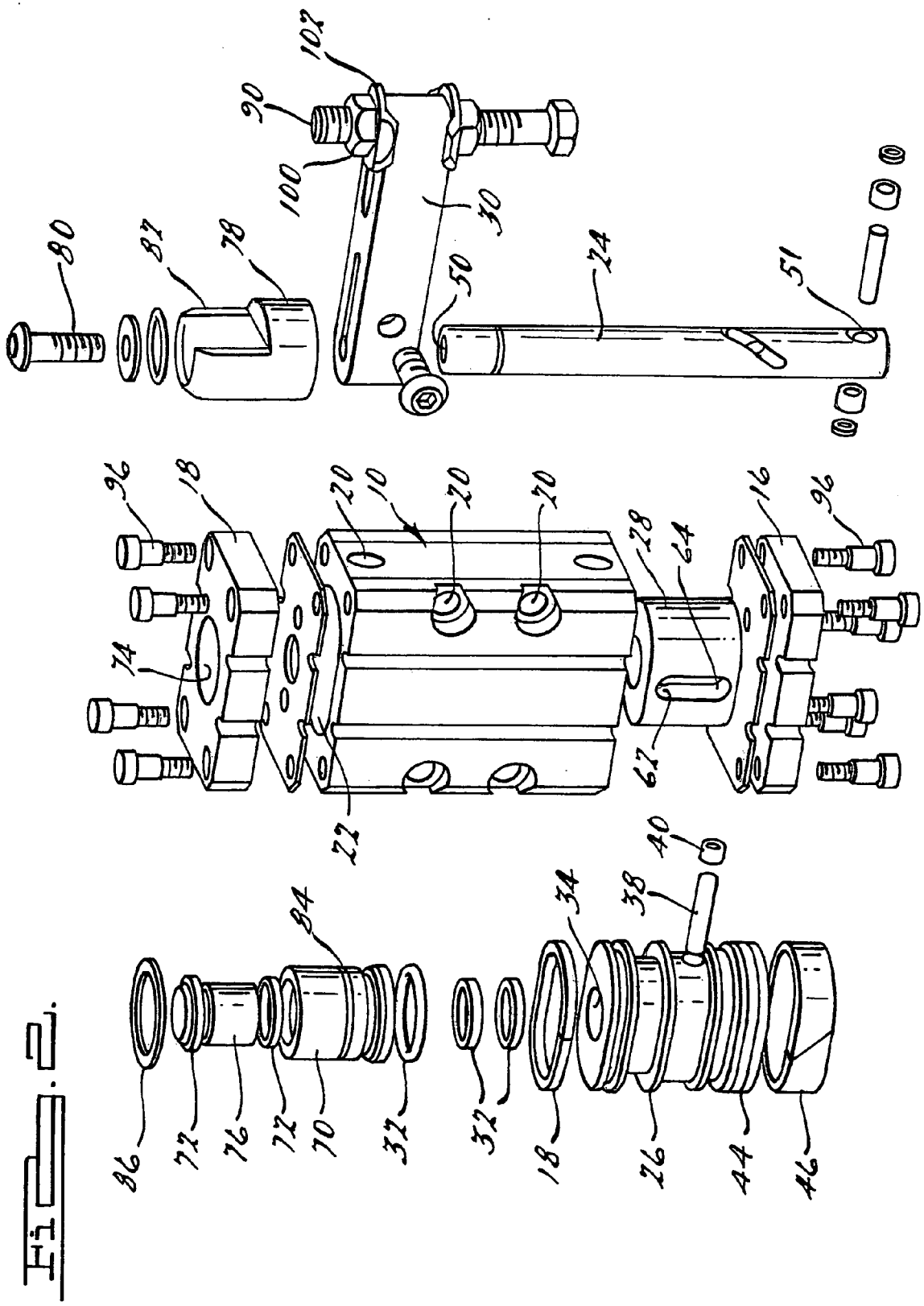

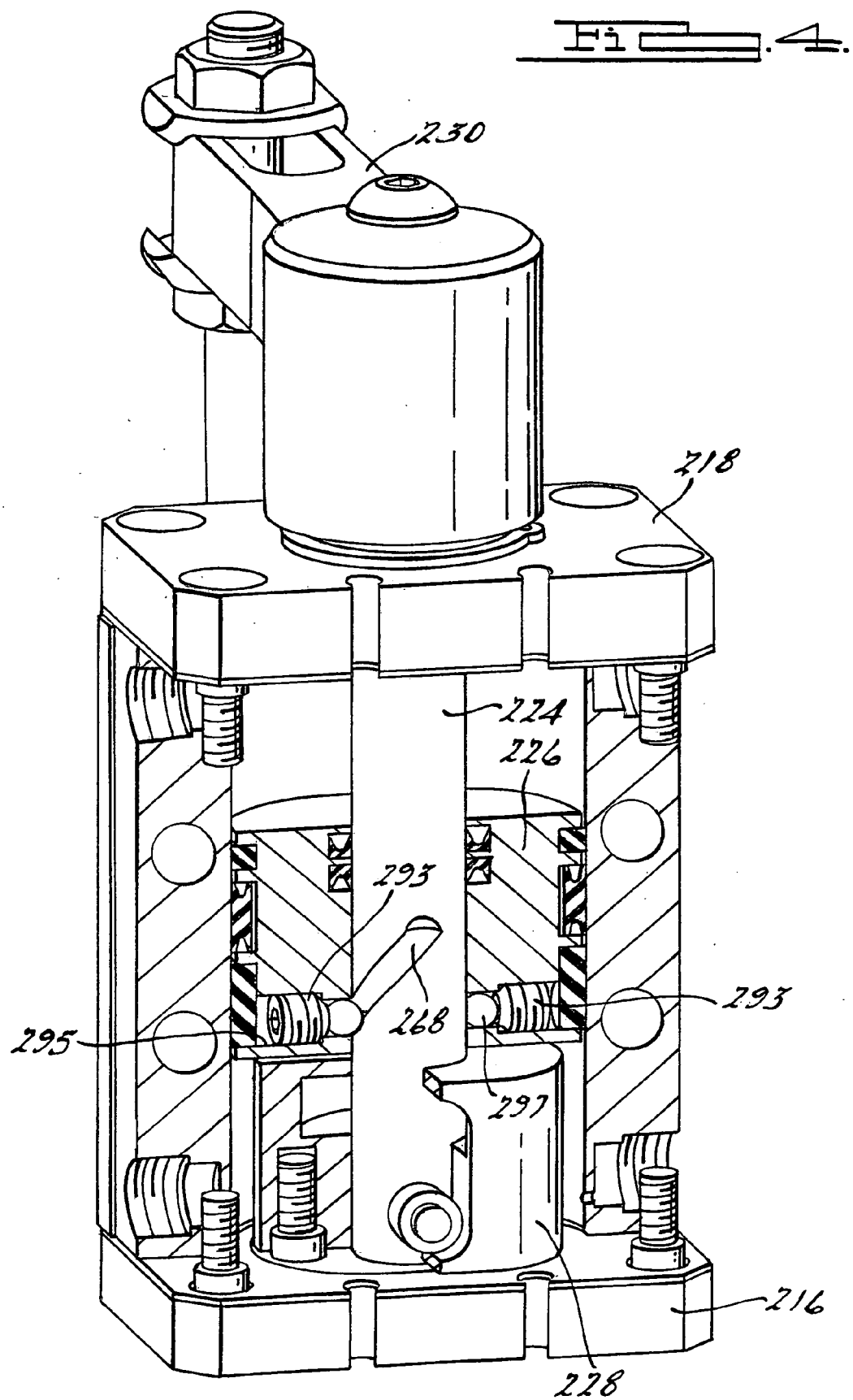

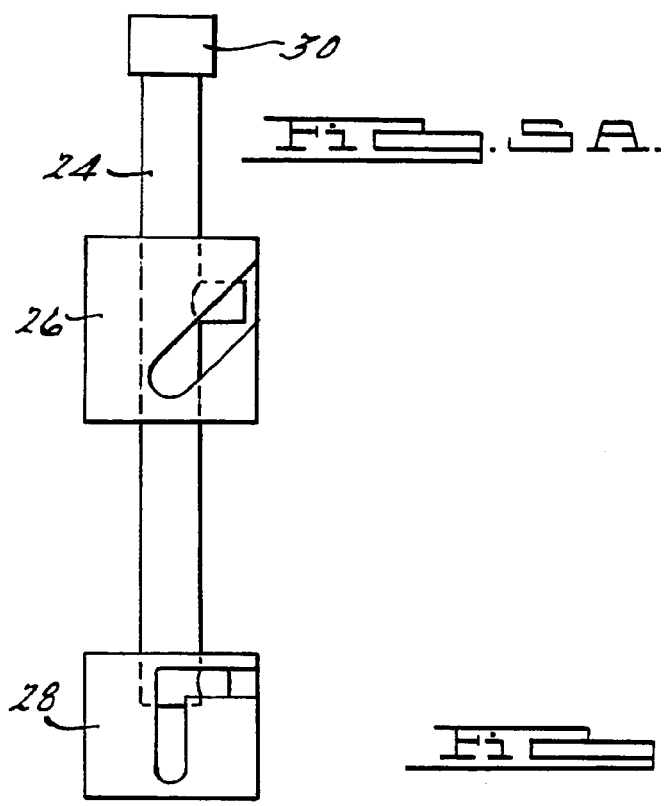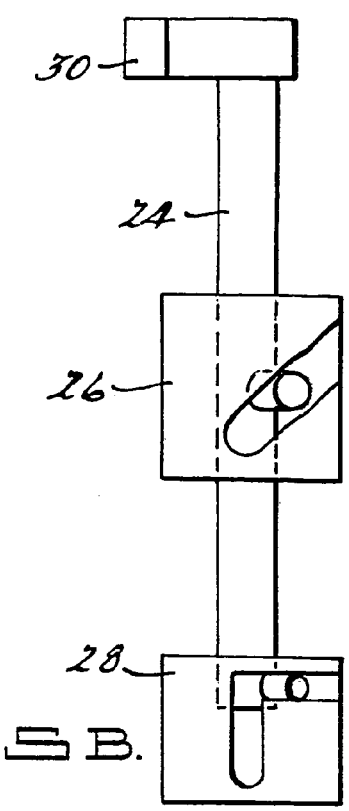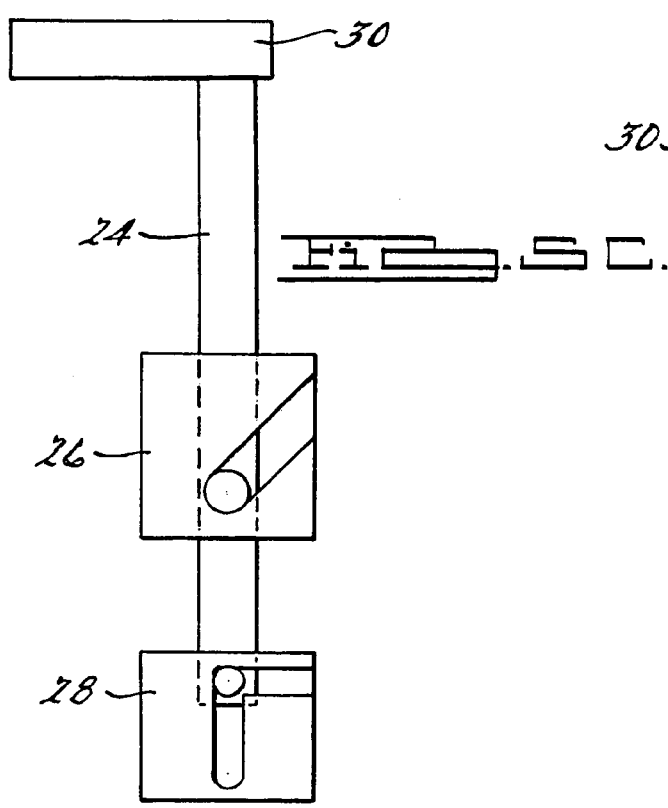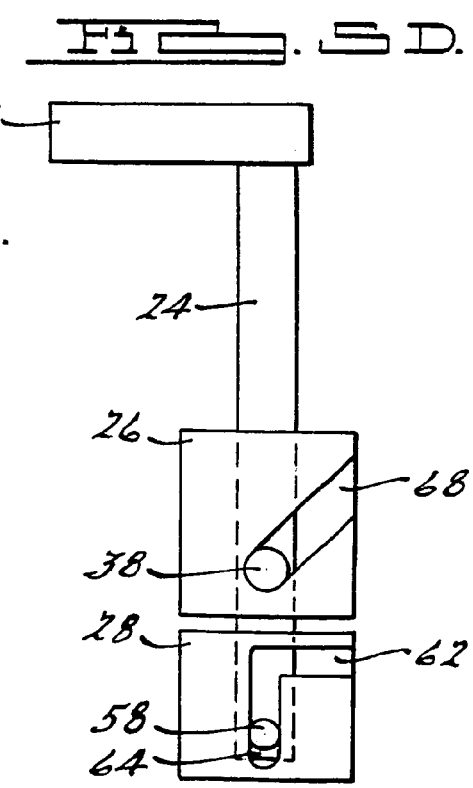

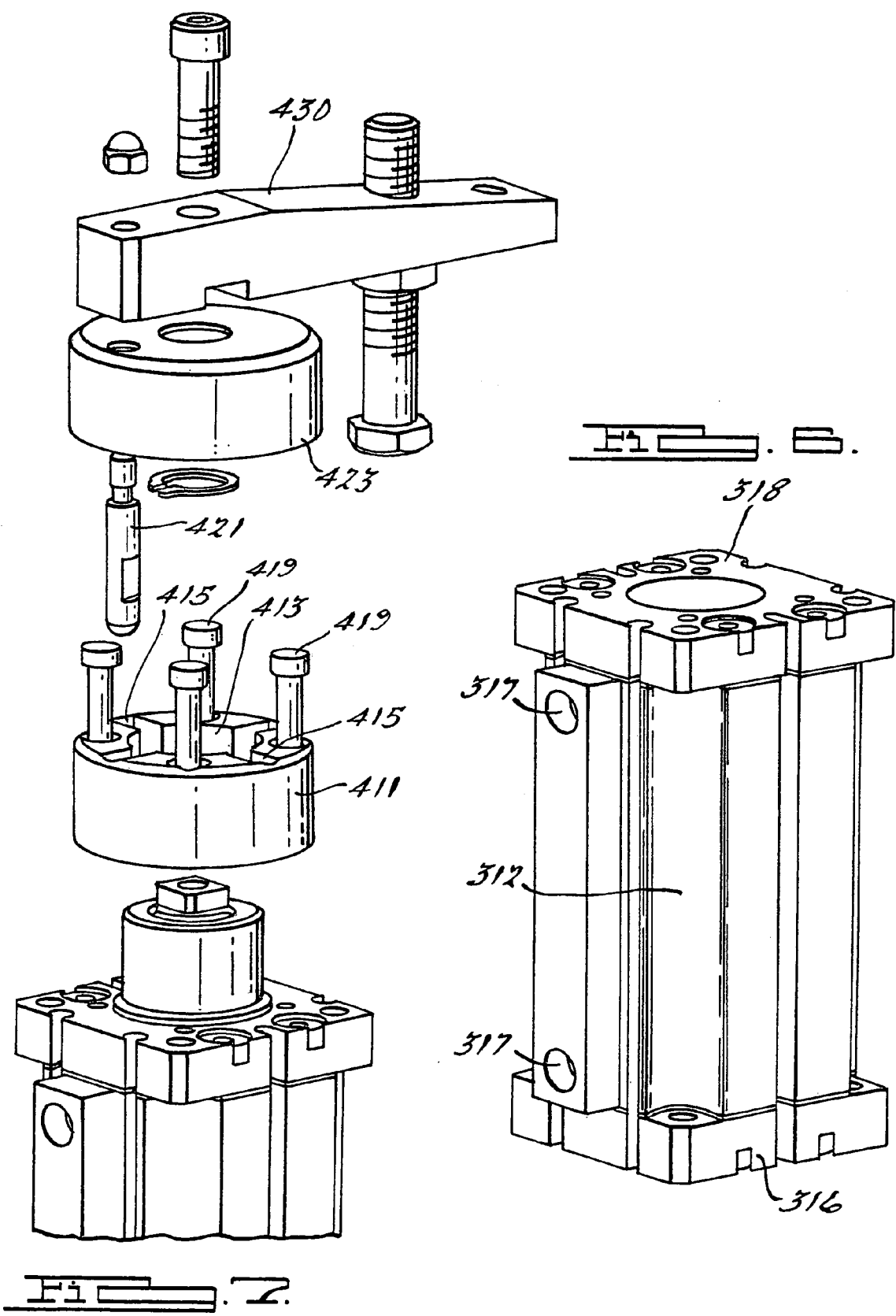

ated Feb. 8, 2005

BACKGROUND OF THE INVENTION

This invention will broadly relate to cylinders, and more particularly relate to a swing cylinder especially for holding workpieces.

Swing cylinders and swing clamping devices are well known in the art. Generally, the cylinder is sealed on the end away from the clamping arm with a flange connecting plate, and a swinging guide sleeve for the piston rod, which has a relatively small diameter with respect to the inside diameter of the cylinder. The piston rod is secured only in and on a relatively short bore of the upper cylinder bottom which forms a unit with the cylinder. Apart from the fact that the cylinder is accessible only from its mounting side end, installation or removal of the piston rod with the piston and the guide sleeve are possible only from the mounting side of the cylinder. The swing guide slot for the piston must remain open in order to be able to remove the piston rod from the guide sleeve at all if it is to remain in the cylinder. The guide slot that is open at the end, however is more or less unstable to a certain extent because it can be spread apart more or less conically unless it is over diminished with regard to its wall thickness. Many prior art swing clamping devices also include components that can be inserted into the cylinder from either side. Such components can also be removed from the same sides of the swing cylinder. Many of these prior art swing cylinders rotate to a closed position from an open position in a helical type rotating pattern which allows the swing cylinder to rotate to an open position from a closed position along an angled rotating surface like that of a screw thread.

Many of these prior art swing cylinders may have problems with repeating the exact clamping forces at an exact position due to the play or wobble generally located in the swing cylinder components. Furthermore, many of these prior art swing cylinders cannot hold with a force that the clamp cylinder is capable of producing because of deflection and wobble of internal components of the prior art swing cylinders. The use of a helical rotating swing arm in prior art swing cylinders increases the foot print and area surrounding the swing cylinder necessary to operate in the various manufacturing environments. The increase in foot print and surrounding areas decreases the efficiency of the manufacturing line while increasing the cost by enlarging the space needed to operate the manufacturing line.

Most of the prior art swing cylinders use a guide sleeve arranged around a piston rod which will rotate the piston rod in a generally helical type pattern that rises at a predetermined angle in a constant manner. Therefore, all of the rotating parts around the guide sleeve increases wear and reduces the durability of the swing cylinder clamp in the manufacturing environment. Therefore, there is a need in the art for an improved swing cylinder. There also is a need in the art for an improved swing cylinder that has a smaller foot print. There also is the need in the art for a swing cylinder that operates along two planes only thus reducing the area needed for the swing clamp to operate.

There also is a need in the art for a new swing cylinder that has greater clamping force without increasing the size of the clamp foot print. There also is a need in the art for a clamp that has a predetermined exactness of location repeatability that will allow for a smaller clamp to operate in precise holding situations found in some manufacturing environments.

There also is a need in the art for a swing cylinder that uses an oval bore in a cylinder to increase the strength of the swing clamp and the holding force the swing clamp can apply.

SUMMARY OF THE INVENTION

One object of the present invention is to provide an improved swing cylinder.

Another object of the present invention is to provide a swing cylinder that operates in two planes and will rotate in the first plane and then move linearly or up/down in a second plane to a clamped or unclamped position.

Another object of the present invention is to provide a clamp with a greater clamping force while having a small foot print.

Still another object of the present invention is to provide a clamp that has a piston rod supported at both a top and bottom portion thereof. This supporting of the piston rod at the top and bottom will allow for a greater holding force in the swing cylinder with the same pressure of prior art clamps.

Still another object of the present invention is to provide a swing cylinder where the rod is completely enclosed and is capable of small precise movements.

Still another object of the present invention is to provide an oval bore which holds an oval piston to keep the piston from rotating.

Still another object of the present invention is to create a swing cylinder that has precise repeatability thus allowing for an exactness of location to the clamp when it is in its closed or clamped position.

Still another object of the present invention is to have a clamp capable of being manufactured and used in manufacturing environments in a plurality of sizes from extremely small swing cylinders to extremely large swing cylinders.

Still another object of the present invention is to provide a more robust and durable swing cylinder that is enclosed and will prevent contaminates from the manufacturing environment from entering and contaminating the swing cylinder internal components.

Still another object of the present invention is to provide a swing cylinder that will reduce costs and reduce the cost of manufacturing other components.

According to the present invention, the foregoing and other objects and advantages are obtained by a novel swing cylinder. The swing cylinder includes a body having a bore therein with a piston slidingly arranged within the bore. The piston has a piston rod that is attached to an arm on one end and a guide housing on the opposite end. The piston rod includes a track or slot through one portion thereof wherein that track or slot aligns with a pin or other member supported by the piston within a bore therein. The track or slot will allow for rotation of the arm with respect to an end of the swing cylinder. The guide housing will allow for linear or up/down motion of the arm with respect to an end of the swing cylinder in order to place the swing cylinder clamp in either an open or closed position. The piston rod will be supported on both ends thereof and be completely enclosed to protect it from harsh manufacturing environments. It should be noted that the swing cylinder will operate by moving in two planes, one a horizontal plane with respect to an end of the cylinder which will cause rotation in a circular motion and then a vertical plane with respect to an end of the cylinder which will move the clamp in a up and down motion between a clamped and unclamped position.

Other objects, features and advantages of the present invention will become apparent from the subsequent description and appended claims taken in conjunction with the accompanying drawings.

BRIEF DESCRIPTION OF THE DRAWINGS

FIG. 2 shows an exploded view of a swing cylinder according to the present invention.

FIG. 4 shows an alternate embodiment of a swing cylinder according to the present invention.

FIGS. 5A-D show the swing cylinder during operation according to the present invention.

FIG. 6 shows an alternate embodiment of a swing cylinder according to the present invention.

FIG. 7 shows an exploded view of a guide device for use on a swing cylinder according to the present invention.

DESCRIPTION OF EMBODIMENT(S)

Figure 1:
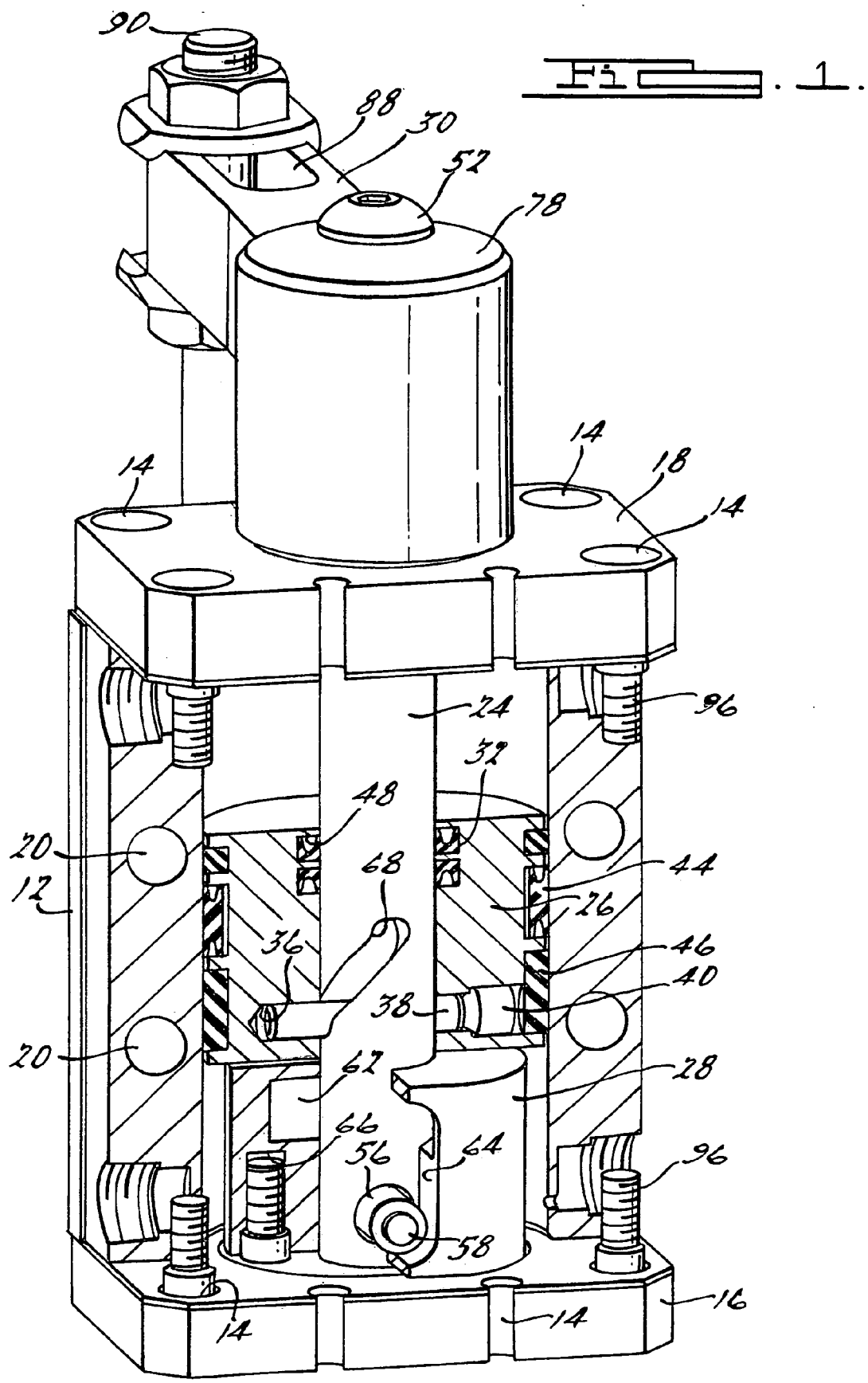
FIG. 1 shows a partial cutout of a swing cylinder according to the present invention.
Figure 3A:
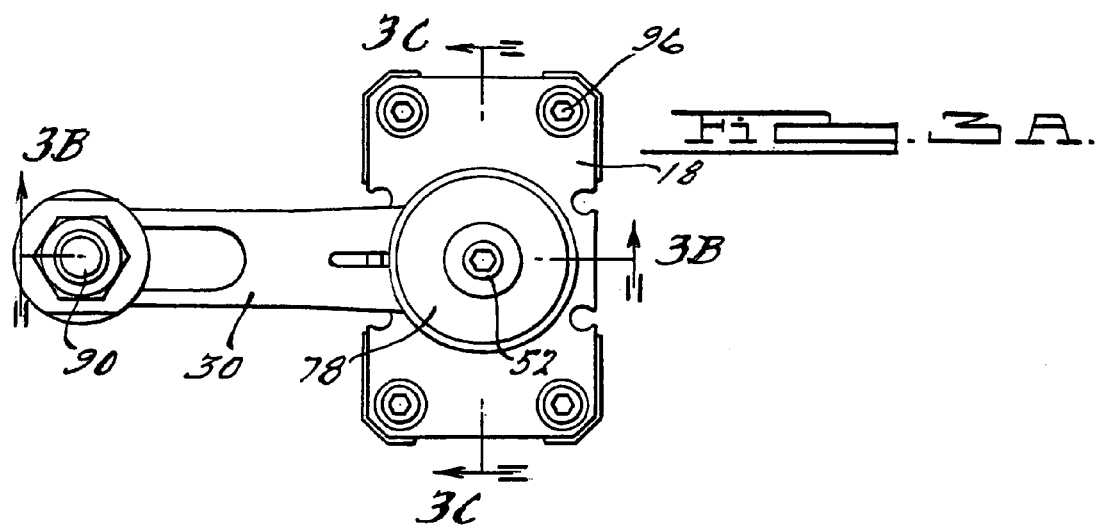
FIGS. 3A-C show a top view of the swing cylinder according to the present invention along with two cross sectional views of the swing cylinder taken along sections A-A and B-B.
Figures 3B, 3C:
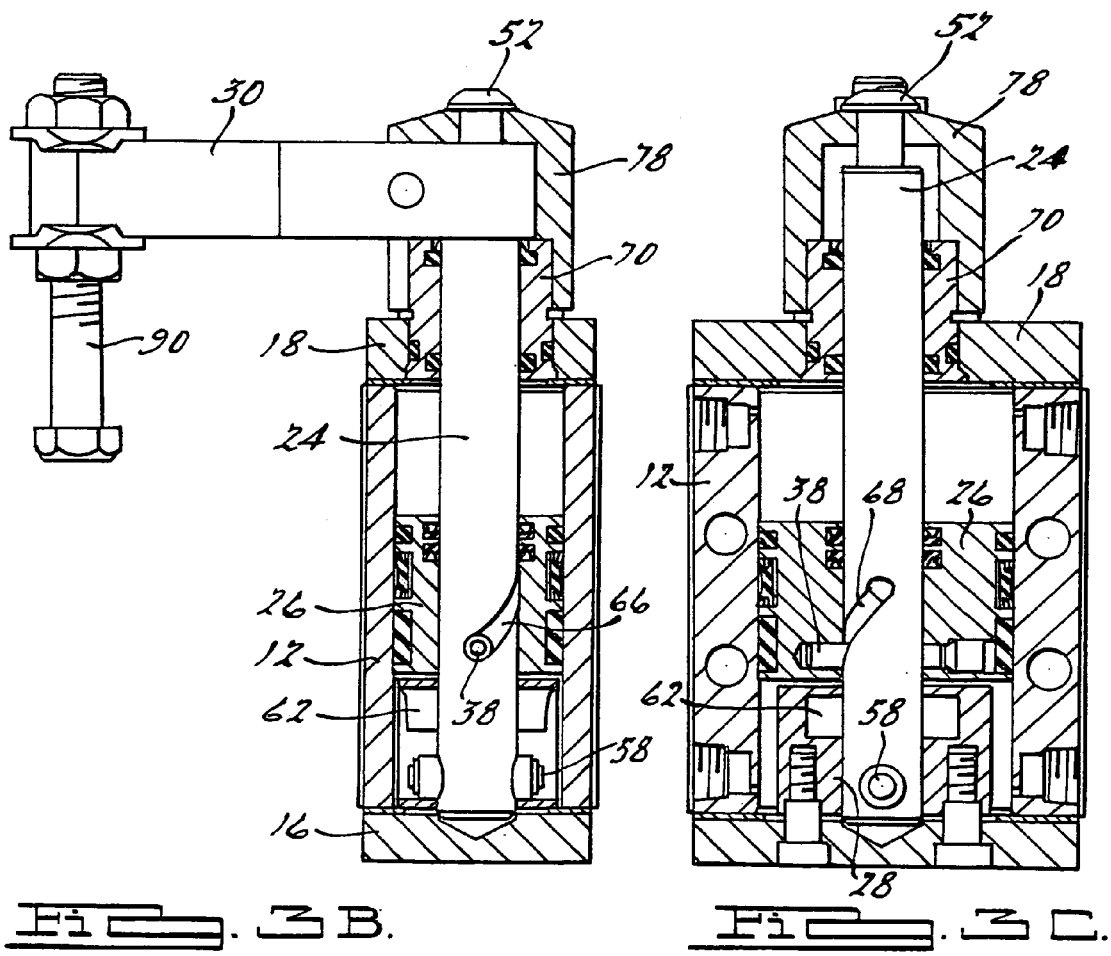

A swing cylinder 10 according to the present invention is shown in FIG. 1-3. The swing cylinder 10 will be for use in any number of manufacturing environments and will be capable of being sized from extremely small swing cylinders to extremely large swing cylinders to cover industries as vast as robotic industries for electronic components manufacture to holding automobile cars or the like as workpieces in an manufacturing environment. The flexibility of size and operation of the swing cylinder 10 is a key advantage of the present swing cylinder 10 over those of the prior art. As shown in the Figures, the swing cylinder 10 includes a body 12 that generally has a rectangular cross section. The body 12 includes a plurality of orifices 14 through an end thereof for use in securing an end cap 16 and a front cap 18 to respective sides thereof. The body 12 also includes a plurality of orifices 20 or cavities 20 therein some of which may be threaded for use in mounting the swing cylinder 10 in the manufacturing environment to a plurality of tools, clamps, robot end arms, hydraulic, pneumatic or electrical systems, or other components used in the manufacturing environment. The body 12 has a bore 22 through a center point thereof. The bore 22 in the present invention has a generally oval shape. However, it should be noted that any other shaped bore may be used depending on the configuration and design requirements for the swing cylinder 10.

A piston assembly is arranged within the bore 22 of the body 12. The piston assembly includes a piston rod 24, a piston 26 arranged around the piston rod 24, wherein the piston 26 has an oval shape to match that of the inner bore 22. A guide housing 28 is arranged on one end of the piston rod 24 and an arm 30 is attached to the opposite end of the piston rod 24. A plurality of seals, bands, and rings 32 are also arranged around the piston rod 24. The piston 26 generally has an oval shape to match that of the inner bore 22 of the swing cylinder 10. However, it should be noted that the piston 26 can have any shape that is necessary to mimic the inner shape of the inner bore 22 of the body 12. The piston 26 includes a circular orifice 34 through a mid point thereof. The circular orifice 34 is where the piston rod 24 will be arranged therein. The piston 26 also includes a cavity or bore 36 through a portion of the piston 24. The cavity 36 generally has a circular shape and is capable of receiving a pin, dowel, or other cylindrical object 38 therein. The cavity 36 has a predetermined circumference while having an increased circumference on an end thereof to allow for a fastening mechanism 40 to hold the dowel, pin or cylindrical object 38 in proper position within the piston 26. The piston 26 also includes a plurality of circumferential grooves around an outer edge thereof. One of the grooves includes an oval magnetic ring 42, while one of the grooves includes an oval piston seal 44 while the other groove includes a wear band 46 therein. The piston 26 also includes a plurality of circumferential grooves 48 on an inner surface thereof along the inner bore therethrough. These inner grooves 48 have a rod seal 32 arranged within each groove 48.

The piston rod 24 has a cavity 50 in one end thereof that is generally threaded and will receive a fastener 52 therein. The opposite end of the piston rod 24 generally has a circular orifice 54 through a circumference near the end thereof. The orifice 54 will have a bushing 56 arranged therein along with a guide pin, dowel or other cylindrical object 58 wherein the pin or dowel 58 extends beyond the circumference of the piston rod 24. The guide housing 28 has a generally oval shape to mimic that of the inner bore 22 of the cylinder 10 and is arranged over one end of the piston rod 24. It should be noted that the guide housing 28 may have any shape necessary to mimic that of the inner bore 22 of the swing cylinder body 12. The guide housing 28 has a circumferential orifice 50 through a center point thereof, the circumferential orifice 60 will have the piston rod 24 arranged therein. The guide housing 28 will have a circumferential like track 62 arranged within the guide housing 28 near a top end thereof. A linear guide channel 64 is arranged along a mid point in the guide housing 28 through the entire width thereof. As shown in FIG. 2 the channel 64 generally has an oval shape when viewed from a side of the guide housing 28. The guide housing 28 will have the channel 64 arranged perpendicularly to the circumferential track 62 of the guide housing 28. The guide pin 58 will be arranged through the guide housing 28 and piston rod 24. The guide pin 58 interacts with the channel 64 of the guide housing 28 and the circumferential track 62 throughout different phases and times of the clamping and unclamping of the cylinder 10. This connection will slidingly engage the guide pin 58 to the guide housing 28 while also connecting it to the end of the piston rod 24. The guide housing 28 also includes a plurality of orifices 66 through one end thereof. These orifices 66 will secure the guide housing 28 to the end cap 16. The end cap 16 is then connected to one end of the body 12 via the other orifices 14 through the end cap 16.

The piston rod 24 also includes a generally helical shape slot 68 through a predetermined circumference thereof. The slot 68 is placed at a predetermined position on the piston rod 24 to allow for proper movement of the piston 26 within the cylinder body 12. It should be noted that a track 168 may be used and will have a groove machined or cast into a surface of the piston rod 24 a predetermined depth as shown in FIG. 4. Whereas the slot 68 will be bored, casted or machined through the entire circumference of the piston rod 24 and will allow for a cylindrical rod 38 to be placed therein. The piston 26 is slid over the piston rod 24 such that the slot 68 will align with circumferential cavity 36 of the piston 26. Then the pin or dowel 38 will be placed into the cavity 36 of the piston 26 and through the slot 68 of the piston rod 24. This will secure the piston rod 24 to the piston 26 and allow for rotation of the piston rod 24 at a predetermined time. It should be noted that the piston rod 24 may be designed such that 360 degree rotation is capable for the piston rod. Therefore, the piston 26 will slide with respect to the piston rod 24 within the slot 68 of the piston rod 24 during predetermined situations or times in the opening or closing of the cylinder 10.

The piston assembly also includes a rod gland 70 arranged around the piston rod 24. The rod gland 70 has a plurality of seals and rod wipers 72 arranged within circumferential inner grooves of the rod gland 70. The rod gland 70 also includes a seal on an outer surface thereof that will create a seal between the front cap 18 and the rod gland 70. This will ensure no contaminates are capable of entering the internal components of the swing cylinder 10. The rod gland 70 is arranged within a bore 74 located at a center point of the front cap 18. The rod gland 70 will extend a predetermined distance from the end of the front cap 18. A rod bearing 76 is arranged with the rod gland 70. A rod shield 78 will be placed over the exposed end of the rod gland 70 and one end of the arm 30. The rod shield 78 will include an orifice through a center point thereof. This orifice will be used to connect, via a fastener 80, to the bore end of the piston rod 24. The rod shield 78 includes an orifice or cutout 82 through a side thereof through which the arm 30 extends. The rod shield 78 slidably engages with an outer surface of the rod gland 70 and is capable of sliding up and down along the entire length of the rod gland 70 extending from the front caps 18. The rod gland 70 also is secured within the orifice of the front cap 18 via a shoulder portion on one end of the rod gland 70 and a groove 84 located at a predetermined position on an outer circumference of the gland 70. Within this outer circumferential groove 84 of the gland 70 is placed any known fastener 86 such as a retaining ring. Therefore, the rod gland 70 is fixed with respect to the front cap 18 and body 12 of the swing cylinder 10 wherein the piston rod 24 is capable of movement with relation to the front cap, rod gland and guide housing.

The arm 30 generally has a rectangular shape with a channel 88 through one surface thereof. Through this channel 88 is arranged a hold mechanism or spindle 90 such as a bolt or other device for holding the part being worked on in the manufacturing environment. The channel 88 will allow for the bolt or other fastening hold device to be placed along different radius of the arm 30. The arm 30 includes an orifice through an opposite end thereof that will allow a fastener 52 to pass therethrough thus allowing for the arm to be connected to the end of the piston rod 24. The arm 30 may also include other orifices through side surfaces or other portions to allow for connections or other mounting options for the holding member or spindle 90. The arm 30 will have an orifice that is capable of receiving a fastener 92 that will allow the arm 30 to be secured in predetermined positions with respect to the piston rod 24. This will include a keyed shaft for positive location at predetermined locations for the arm 30 on the piston rod 24. It should be noted that the arm 30 may be used without a key for infinite radial placement of the arm 30. The keyed shaft generally will have a keyed position every 90 degrees to allow for positive location at predetermined positions. However any other keyed arrangement may be used to include any increment of degrees for the keyed shaft locations. The fastener 92 that is used in one of the orifices through the arm 30 will allow for the arm 30 to be securely fastened to the piston rod 24 at a predetermined position. It should be noted that the arm 30 of the present invention may be of an extruded design which will allow the spindle or holding member 90 to be placed at different lengths without machining the arm 30 thus providing flexibility for the swing cylinder 10 in any type of manufacturing environment.

It should be noted that all of the parts described above are generally made of a steel material, however any other type of metal, ceramic, plastic, composite or the like may be used. It should be realized that many of the rings and seals are made of a plastic product such as an elastomer or such, however any other type of metal, composite, paper, plastic, rubber or other material may be used including other natural material or synthetic material may also be used. It should be noted that fasteners 96 used to connect the end cap 16 and front cap 18 to the body 12 are generally threaded fasteners but any other type of fastener or fastening method may be used to connect the end cap 16 and front cap 18 to the body 12. The spindle 90 may be such that an aluminum nut 98 is located on one end thereof and that nuts 100 along flange spacers or washers 102 are aligned on either end of the arm 30 to allow for sliding of the spindle 90 along the radially extending channel 88.

It should be noted that the overall height of the clamp 10 can vary between very large swing cylinders to extremely small swing cylinders all with a slightly smaller foot print than that of prior art swing cylinders. It should be noted that the mounting holes 26 are capable of being connected to robot end connectors, machinery, clamps, and any other type of component used in an manufacturing environment. It should further be noted that the piston 26 floats on the piston rod 24 and that the heavy wear band 46 prevents any metal to metal contact. The heavy wear band 46 generally is made of a polymer material however any other type of plastic, ceramic, metal, composite, fabric or the like may also be used for the heavy wear band 46. The piston rod 24 is supported at both the top and bottom of the rod 24 thereof. This will minimize any deflection and result in greater clamping forces than that of prior art swing clamps. The supporting of the piston rod 24 occurs via the rod gland 70 on the top end thereof and the guide housing 28 at the bottom portion thereof. It should also be noted that the piston rod 24 is completely enclosed thus providing protection from damage and contamination in the harsh manufacturing environments in which swing cylinders are used. It should be noted that the guide housing 28 provides a very accurate home positioning device for the swing cylinder 10. This will allow the clamp 10 to constantly repeat to the same home position with an exactness that is currently not available in prior art swing clamps.

The arm 30 of the present invention travels on a single horizontal plane during the swing or rotational movement resulting in no linear travel during rotation thereof. With no linear travel during this rotation it will allow the clamp to be used in low profile applications. This will also require less distance between the unclamped point and the work piece which is a desirable safety feature in the modern day manufacturing environment.

In operation the new swing cylinder 10 according to the present invention will be used in manufacturing lines ranging anywhere from as large as the automobile manufacturing lines to small electrical component manufacturing lines. The swing cylinder 10 will be capable of being operated on very large scales or small scales depending on the design requirements of the manufacturing line. The clamp 10 will move between a closed or clamped position to an open or unclamped position.

FIG. 5 shows the unique operating sequence of the swing cylinder 10 according to the present invention. FIG. 50 shows the swing cylinder 10 in its closed or clamped position. In this position the pins 58, 38 arranged through the piston rod orifice 54 and slot 68 respectfully, are arranged at the bottom of the slot 68 in the case of the piston 26 and at the bottom of the channel 64 on the locating housing 28. When the operator of the manufacturing line wants to open the clamp or cylinder 10 to its open position, the clamp operator will provide the necessary instructions to create a force either via fluid pressure, air pressure, mechanical movement, electronic movement or any other known force depending on the type of clamp and the requirements to operate its internal workings and move the piston 26 in an upward direction towards the front cap 18. Thus, the piston 26 will slide towards the front cap 18 with the arm 30 staying in the same vertical plane due to the fact that the piston 26 has an oval shape thus not allowing the piston rod 24 to rotate with relation to the swing cylinder 10. The piston rod 24 will move in an up and down direction with no rotation until it reaches the top of the oval channel 64 in the locating housing 28. Once the pin 38 at the end of the piston rod 24 reaches the top of the channel 64 the piston rod 24 will be free to rotate with respect to the piston 26 and swing cylinder 10 thus rotating in a horizontal plane with respect to the front cap 18. This rotation will occur by following the spiral slot or groove 68 with a pin 38 inserted in the piston 26. The pin 58 inserted in the end of the piston rod 24 will be capable of rotating within the circumferential track 62 located near a top end of the locator housing 28. Thus, the piston rod 24 will rotate a predetermined number of degrees, in the case shown in FIG. 5 it will rotate 90 degrees, until it reaches its fully open and unclamped position. During operation of the swing cylinder 10 there will be a vertical or linear motion by the piston rod 24 followed by a horizontal or rotating motion by the arm 30 with respect to the front cap 18 to an open position. This will eliminate any linear travel during rotation of the arm 36. This is desirable in the manufacturing environment especially in low profile applications thus requiring less distance between the unclamped point and the workpiece which is a desirable safety feature as well. No other prior art swing cylinders operate in the manner described above with linear motion followed by rotating motion or vice versa occurring in two separate planes at two separate instances. The ability to provide such movement is accomplished between interaction of the piston rod 24 having the spiral channel or groove 62 therein and the locator housing 28 having the circumferential track 62 along with a channel 64 therein. To put the clamp 10 into its fully clamped position the clamp 10 will first rotate a predetermined numbered of degrees, as shown in FIG. 5 90 degrees, until the pin 38 engages with the bottom portion of the spiral track 68 while the pin 58 aligns with channel 64 then the piston rod 24 will continue with no further rotation to its fully closed position when the piston rod 24 is at or near the bottom of the channel 64 which is aligned with the center point of the piston rod 24. Thus, the channel 64 is parallel to the piston rod 24 and will allow for a linear movement of the piston rod 24 without any rotational movement of the piston rod 24 during the final clamping positioning of the swing arm 30.

It should be noted that having the piston rod 24 supported at both the top and bottom portions allow for greater clamping force because of the reduction and deflection of the internal clamping components including the piston rod 24. It also will allow for greater holding forces to occur with the same pressure with that found in prior art swing cylinders. The rod is also completely enclosed thus protecting it from the harsh environment and the manufacturing lines and it is also capable of small movements thus allowing it to be used on small manufacturing lines which need small parts held in precise areas. The oval piston 26 will keep the piston 26 from rotating thus only allowing the piston rod 24 to rotate when it engages the circumferential track in the locator housing 28. It should be noted that the clamp 10 is capable of swinging the arm 30 in a 360 degree arc depending on the design of the circumferential guide slot in the locating housing 28. The repeatability of the clamp along with the exactness of location of the clamped force by the swing arm is desired by many in the art. The use of an oval cylinder and a swing cylinder is novel and will afford better exactness, more robustness and greater durability than that of prior art swing cylinders.

FIG. 4 shows a second contemplated embodiment of a swing cylinder 210 according to the present invention. Like numerals indicate like parts. The clamp or cylinder 210 in FIG. 4 generally has the setup and components as that described above for FIGS. 1-3 except that FIG. 4 uses a track 268 either machined are cast into the piston rod 224 instead of a slot through the entire piston rod 224 through which a pin would be placed. In the case of FIG. 4 the track 268 generally has a helical shape such as that described above. The track 268 extends a predetermined distance into the piston rod 224 to allow for a rotating member such as a sphere 299 to be rotated and slid along the track 268. As shown in FIG. 4, a sphere 299 is arranged between the track 268 on one side while on the opposite side a mirror track 268 is placed along with a second sphere or ball 297. The balls 297, 294 will rotate with the tracks 268 between a fully clamped position and a fully open position. The balls 297, 299 will be arranged within a circumferential like orifice 295 and held in place by any known fastener 293. A set screw 293 is used in the embodiment shown. The orifice 295 through which the spheres 297, 299 are arranged will have a larger diameter on one end thereof to allow for the insertion of the set screw 293 while having a smaller diameter that will match and mimic that of the sphere or ball 297 to allow for rotation of the ball 297 while also holding the ball 297 in a generally precise position with relation to the track 268. The operation of the embodiment of the clamp 210 shown in FIG. 4 is exactly like that described above wherein from an open position the balls 297, 299 are moved from the top portion of the track 268 down to the bottom portion of the track 268 thus allowing the swing arm 230 to swing through a predetermined arc on a single plane that is parallel to the front cap 218. When the balls or spheres 297, 299 encounter the bottom of the track 268 the piston 226 will continue its downward motion towards the end cap 216 until the guiding pin 258 engages or comes near to the bottom of the oval track 264 in the locating housing 228. This will thus place the swing cylinder 210 in its fully clamped position after having moved through a rotational swing arc and then in a vertical linear motion to the clamped position.

FIG. 6 shows an alternate embodiment of a swing cylinder body 312, front cap 318, and end cap 316. This alternate embodiment creates a unique foot print for the swing cylinder 318 for the manufacturing environment. The body 312 includes at least one cavity or orifice 317 therein. The orifice 317 may be used to secure and align the body 312 with relation to a tool, manufacturing line or other device. The internal components are the same as those described above for the other embodiments.

FIG. 7 shows an external guide device 411 for use on any embodiment of the swing cylinder according to the present invention. The guide device 411 includes an orifice 413 therethrough with a plurality of pockets 415 arranged around a periphery of the orifice 413. The guide device 411 is secured to the front cap 418 by fasteners 419. A pin 421 is secured to arm 430 on one end thereof. The pin 421 will be arranged within one of the pockets 415 when the swing cylinder 410 is in its clamped or closed position. A cover 423 is arranged on the guide device 411 and will protect the guide device 411 from weld slag and other debris or contaminates. The guide device 411 if used will allow for very accurate repeatability of the arm 430 in its clamped position.

While it may be apparent that the preferred embodiment and the invention disclosed is well calculated to fill benefits, objects or advantages of the present invention, it should be appreciated that the invention is susceptible to modification, variations and change without departing from the proper scope of the invention as shown.

What is claimed is:

1. A swing cylinder, said swing cylinder including:
   a rod;
   a piston arranged on said rod;
   an arm arranged on one end of said rod; and
   a guide housing arranged on an opposite end of said rod, said guide housing having a generally circumferential track within said guide housing, said arm rotates in a first plane, said first plane is perpendicular to an axis of said rod, said arm moves in a linear direction in a second plane, said second plane is parallel to said axis.

2. The cylinder of claim 1 wherein said rod having a slot through a diameter or a groove on a surface.

3. The cylinder of claim 2 wherein said slot or said groove having a generally helical shape.

4. The cylinder of claim 1 wherein said piston having a generally oval shape circumference.

5. The cylinder of claim 4 wherein said piston having an orifice therethrough, a fastener arranged in said orifice, said fastener interacts with said rod.

6. The cylinder of claim 1 wherein said guide housing having a channel, said channel arranged perpendicular to said track.

7. The cylinder of claim 6 wherein said rod having an orifice near one end thereof, a pin arranged in said orifice, said pin interacts with said guide housing.

8. The cylinder of claim 7 wherein said pin slides within said channel and within said track.

9. A swing cylinder for use in a manufacturing environment, said swing cylinder including:
   a body;
   an end cap arranged on each end of said body;
   a piston arranged within said body;
   a rod engaged with said piston and extending through one of said end caps;
   an arm attached to said rod on one end thereof; and
   a guide arranged on one end of said rod, said guide attached to one of said end caps, said guide having a generally circumferential track within said guide near one end thereof.

10. The swing cylinder of claim 9 wherein said piston having a generally oval shape, said body having a generally oval shaped bore therein.

11. The swing cylinder of claim 9 wherein said arm rotates in a first plane which is perpendicular to an axis of said rod, said arm moves in a linear direction in a second plane which is parallel to said axis.

12. The swing cylinder of claim 9 wherein said rod having a generally helical slot or groove at a predetermined position.

13. The swing cylinder of claim 12 wherein said piston interacts with said slot or said groove.

14. The swing cylinder of claim 9 wherein said guide having a channel, said channel arranged along a mid point of said guide, said channel being perpendicular to said track.

15. The swing cylinder of claim 9 wherein said rod having an orifice through a diameter thereof.

16. The swing cylinder of claim 9 further including a rod gland arranged over said rod and in contact with one of said end caps on an outer surface thereof.

17. The swing cylinder of claim 16 further including a rod shield covering said rod gland and a portion of said arm.

18. The swing cylinder of claim 9 further including an external guide device connected to one of said end caps, a cover arranged over said guide device.

* * * * *